No. 783,492. PATENTED FEB. 28, 1905.
F. L. WILLIAMS & E. STULTZ.
WRENCH.
APPLICATION FILED FEB. 17, 1904.
2 SHEETS—SHEET 2.
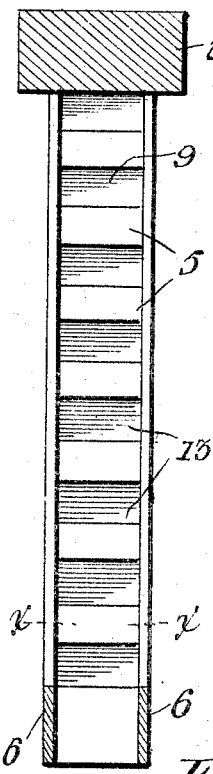
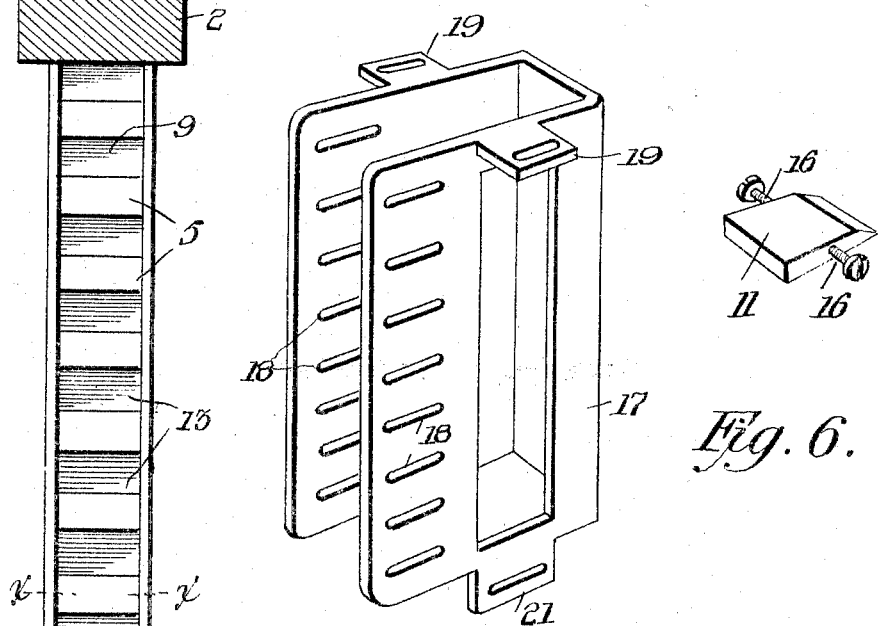
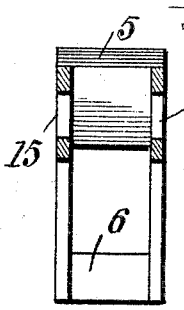
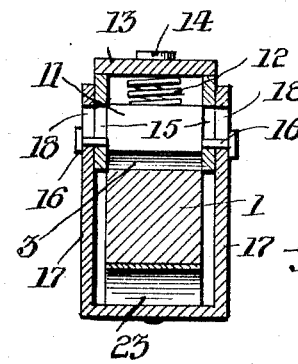
Witnesses:
K. H. Butler
C. Klortemann
Inventors
F. L. Williams and
E. Stultz,
By N. C. Evert & Co.
Attorneys.

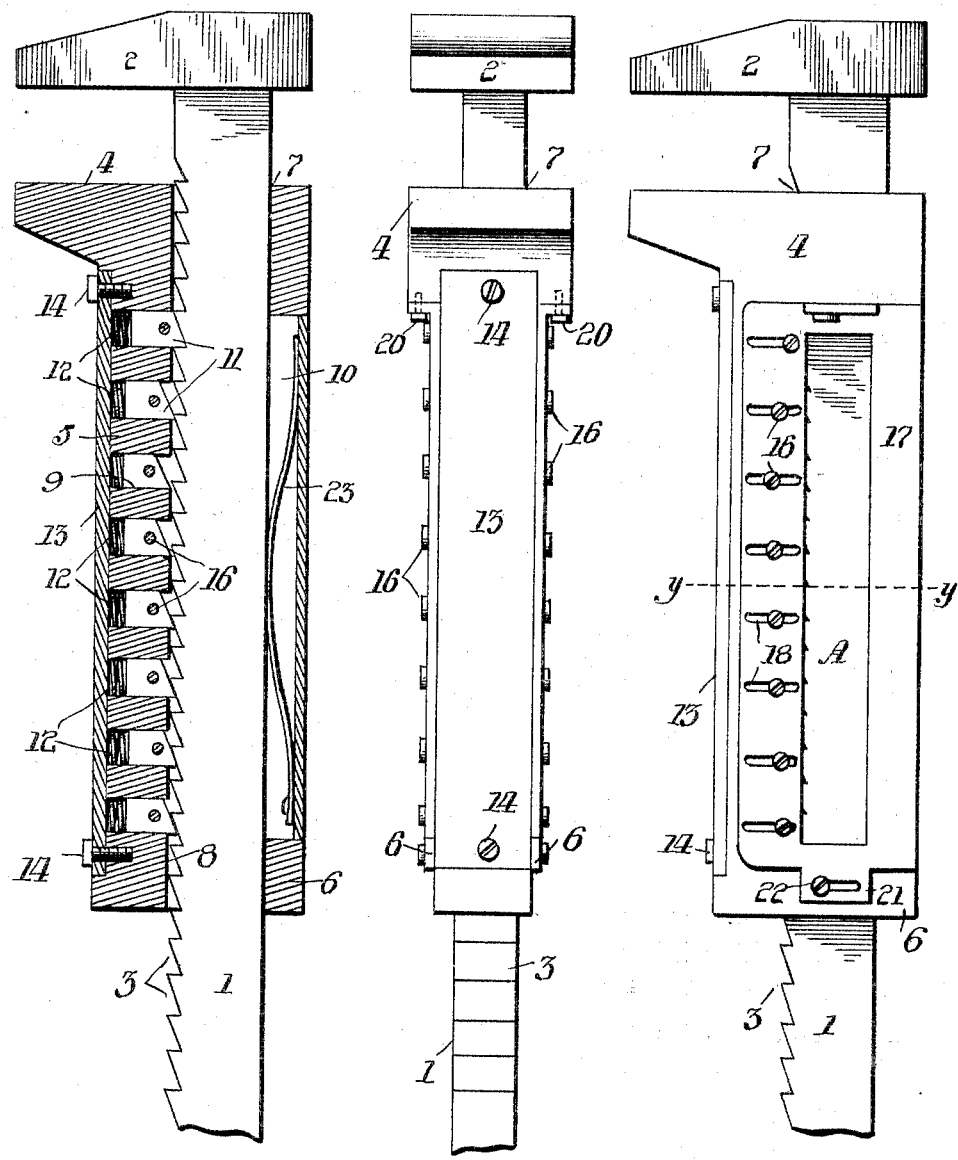

No. 783,492. Patented February 28, 1905.

UNITED STATES PATENT OFFICE.

FRANK LESLIE WILLIAMS AND EDWARD STULTZ, OF NEW KENSINGTON, PENNSYLVANIA.

WRENCH.

SPECIFICATION forming part of Letters Patent No. 783,492, dated February 28, 1905.

Application filed February 17, 1904. Serial No. 194,011.

*To all whom it may concern:*

Be it known that we, FRANK LESLIE WILLIAMS and EDWARD STULTZ, citizens of the United States of America, residing at New Kensington, in the county of Westmoreland and State of Pennsylvania, have invented certain new and useful Improvements in Wrenches, of which the following is a specification, reference being had therein to the accompanying drawings.

This invention has relation to wrenches, and relates in particular to that class of wrenches wherein a shank having a fixed jaw and provided with a rack on one edge operates in conjunction with a sliding jaw, said sliding jaw carrying means for engagement with the rack on the shank. The adjustment of the sliding jaw on the shank in wrenches of this class is limited, owing to the fact that the sliding jaw is usually provided with a dog to engage the teeth on the shank and that the adjustment is limited to a distance between the teeth on the shank.

In carrying our invention into effect we provide a shank having a rack with inclined teeth on its inner edge, and we provide the sliding jaw which carries a number of independently-movable teeth, and we provide novel means for engaging and disengaging these teeth with the rack on the shank, the said movable teeth being so spaced in the sliding jaw that one tooth at a time will engage with the rack on the shank and so that a very minute degree of adjustment may be secured by the successive engagement with the rack of each of the movable teeth.

In the accompanying drawings, Figure 1 is a vertical longitudinal sectional view of our improved wrench. Fig. 2 is a front elevation of the same. Fig. 3 is a side elevation of the same. Fig. 4 is a vertical sectional view of the sliding jaw detached and with the independent teeth removed therefrom. Fig. 5 is a perspective view of a yoke that is mounted on the sliding jaw and serves to disengage the independent teeth from the teeth on the shank. Fig. 6 is a perspective view of one of the independent teeth. Fig. 7 is a transverse sectional view on the line $x$ $x$ of Fig. 4. Fig. 8 is a transverse sectional view on the line $y$ $y$ of Fig. 3.

The shank 1 of the wrench is a straight flat bar of metal provided with the usual stationary jaw 2 and with a rack 3, said rack extending from near the stationary jaw 2 to any desired point along the shank.

The sliding member of the wrench is composed of a jaw 4 and downwardly-extending portion 5 and a collar 6, said jaw and collar being preferably formed integral with the downwardly-extending portion 5 and the jaw and collar being formed with rectangular slots 7 8, respectively, through which passes the shank 1. The downwardly-extending part 5 of the sliding member is formed with a series of parallel recesses 9 and a longitudinal slot 10, and in the slots 9 are arranged a series of independently-movable teeth 11, which are pressed toward the rack 3 of the shank by spiral springs 12, a plate 13, which is secured to the shank by screws 14, serving to keep the said spiral springs 12 in position in the recesses 9. A series of parallel slots 15 are formed in the sides of the downwardly-extending portion 5, each of said slots 15 being in alinement with one of the recesses 9, and screw-pins 16, carried by the teeth 11, project through slots 15 on each side of the downwardly-extending portion 5.

Upon the back of the sliding member on the side opposite the teeth 11 we arrange a yoke 17, which embraces the sliding member and is formed with parallel slots 18, coinciding with slots 15, pins 16 projecting through the slots 18, and the head of said pins 16 bearing against the yoke on the outside thereof. The yoke 17 is attached to the sliding member by means of slotted ears 19 at the top and screws 20, passing through the slots in the ears and screwing into the jaw 4, and by slotted ears 21 at the bottom, through which pass screws 22, screwing into the collar 6. A spring 23 is attached to the inner side of the yoke and bears against the back of the shank 1.

The independent teeth 11, it is to be noted, are spaced apart a distance slightly greater than the distance between the points of two of the teeth of rack 3, so that when one of these teeth is in such position that its bottom is in engagement with the top of one of the teeth of rack 3 all the other independent teeth will be in such position that their bottoms will be slightly below the tops of the adjacent teeth on the rack. In the drawings we have shown the points of the teeth on the rack as being one-quarter of an inch apart and the points of the independent teeth as being seventeen thirty-seconds of an inch apart, the independent teeth being nine thirty-seconds of an inch in height and the spaces therebetween being each eight thirty-seconds of an inch in height. The result of this construction and arrangement is that when one of the independent teeth—for instance, the uppermost tooth in Fig. 1—is in engagement with one of the teeth of the rack the balance of the independent teeth will be out of engagement therewith, and that when the movable member is moved one thirty-second of an inch the second tooth from the top will engage with the adjacent tooth of the rack and the other independent teeth will successively engage at intervals of one thirty-second of an inch with one of the teeth on the shank at each movement of the sliding member toward the stationary jaw 2, thus providing for an adjustment of one thirty-second of an inch at a time. The rack on the shank can of course have the teeth spaced at any desired distance apart, the independent teeth being spaced according to the distance apart of the teeth on rack 3, so as to produce a successive engagement of the independent teeth in the manner above described.

In operating the wrench it is only necessary when it is desired to adjust the sliding jaw toward the fixed jaw to push the sliding member along the shank, the independent teeth sliding over the teeth on the rack 3 and taking into the teeth on the rack successively in the manner above described. When it is desired to adjust the sliding jaw away from the stationary jaw, the sliding member is grasped in the hand and the yoke 17 pressed inwardly, whereupon the inner ends of the slots 18 will contact with the pins 16 in the independent teeth and force all of the teeth backwardly and out of engagement with the rack 3, when the sliding member can be moved to any desired point, and the yoke 17 being relieved of pressure one of the independent teeth will engage with one of the teeth of the rack and hold the sliding member in its adjusted position.

Having fully described our invention, what we claim as new, and desire to secure by Letters Patent, is—

1. In a wrench, the combination with a shank having a rack on one of its edges, of a sliding member comprising a jaw, a depending portion and a collar, said depending portion being formed with a series of parallel slots, a movable yoke embracing said depending portion and formed with parallel slots coinciding with the slots in the depending portion, a series of independent teeth carried by the sliding member, each of said teeth being socketed in a separate recess in said sliding member, springs bearing against said teeth and pins carried by said independent teeth and projecting through the coinciding slots in the depending portion and in the yoke.

2. In a wrench, the combination of a shank having a stationary jaw and a rack, of a sliding member formed with a depending portion and a collar, independently-movable teeth arranged each in a separate recess in said depending portion, a movable yoke embracing said depending portion for moving said independent teeth laterally to disengage them from the rack on the shank, springs arranged in said recesses, and a plate secured to the sliding member and covering said recesses and serving to maintain the movable teeth and the springs in position in the sliding member, substantially as described.

3. In a wrench, the combination with a shank having a fixed jaw, and a rack on one edge, of a sliding member formed with a series of parallel slots disposed at right angles to the shank, and independent recesses in alinement with said slots, independent teeth arranged in said recesses, springs arranged in said recesses and bearing on said independent teeth, pins carried by said independent teeth and projecting through said slots, a yoke embracing the side bars and engaged with said pins, and a spring arranged between said yoke and shank.

In testimony whereof we affix our signatures in the presence of two witnesses.

FRANK LESLIE WILLIAMS.
EDWARD STULTZ.

Witnesses:
H. C. EVERT,
E. E. POTTER.